(12) United States Patent
Kong

(10) Patent No.: US 9,912,002 B2
(45) Date of Patent: Mar. 6, 2018

(54) ION EXCHANGE MEMBRANE AND METHOD FOR MANUFACTURING SAME

(71) Applicant: Hyundai Electric & Energy Systems Co., Ltd., Seoul (KR)

(72) Inventor: Ji Hyun Kong, Ulsan (KR)

(73) Assignee: Hyundai Electric & Energy Systems Co., Ltd., Seoul (KR)

( * ) Notice: Subject to any disclaimer, the term of this patent is extended or adjusted under 35 U.S.C. 154(b) by 0 days.

(21) Appl. No.: 15/030,991

(22) PCT Filed: Oct. 28, 2014

(86) PCT No.: PCT/KR2014/010192
§ 371 (c)(1),
(2) Date: Apr. 21, 2016

(87) PCT Pub. No.: WO2015/065016
PCT Pub. Date: May 7, 2015

(65) Prior Publication Data
US 2016/0260994 A1    Sep. 8, 2016

(30) Foreign Application Priority Data

Oct. 28, 2013   (KR) ........................ 10-2013-0128470
Oct. 21, 2014   (KR) ........................ 10-2014-0142477

(51) Int. Cl.
| | | |
|---|---|---|
| H01M 8/10 | (2016.01) | |
| H01M 8/18 | (2006.01) | |
| H01M 8/20 | (2006.01) | |
| H01M 8/1041 | (2016.01) | |
| H01M 8/1069 | (2016.01) | |
| C08J 5/22 | (2006.01) | |

(52) U.S. Cl.
CPC ........... *H01M 8/188* (2013.01); *C08J 5/2237* (2013.01); *C08J 5/2281* (2013.01); *H01M 8/1055* (2013.01); *H01M 8/1069* (2013.01); *H01M 8/20* (2013.01); *C08J 2327/18* (2013.01); *H01M 2300/0082* (2013.01); *Y02E 60/528* (2013.01); *Y02P 70/56* (2015.11)

(58) Field of Classification Search
CPC ...................................................... H01M 8/10
See application file for complete search history.

(56) References Cited

U.S. PATENT DOCUMENTS

| | | |
|---|---|---|
| 8,129,074 B2 | 3/2012 | Chen et al. |
| 2003/0194593 A1* | 10/2003 | Fan ........................ C08J 5/2275 429/480 |

(Continued)

FOREIGN PATENT DOCUMENTS

| | | |
|---|---|---|
| JP | 2005-32535 A | 2/2005 |
| JP | 2007-141601 A | 6/2007 |

(Continued)

*Primary Examiner* — Jacob Marks
(74) *Attorney, Agent, or Firm* — Blank Rome LLP

(57) ABSTRACT

The present invention relates to: an ion exchange membrane containing, in a channel, an inorganic particle, substituted with an organic compound including $SO_4^-$ group; and a method for manufacturing the ion exchange membrane. The ion exchange membrane according to the present invention can provide excellent physical properties while also maintaining ion conductivity.

8 Claims, 1 Drawing Sheet

(56) References Cited

U.S. PATENT DOCUMENTS

| | | |
|---|---|---|
| 2005/0042489 A1 | 2/2005 | Fukuta et al. |
| 2007/0015022 A1 | 1/2007 | Chang et al. |
| 2011/0200848 A1* | 8/2011 | Chiang ............... B60L 11/1875 429/4 |
| 2012/0077109 A1 | 3/2012 | Hong et al. |
| 2013/0115504 A1 | 5/2013 | Lee et al. |

FOREIGN PATENT DOCUMENTS

| | | |
|---|---|---|
| KR | 10-2007-0008027 A | 1/2007 |
| KR | 10-2010-0116888 A | 11/2010 |
| KR | 10-2010-0130818 A | 12/2010 |
| KR | 10-110897 B1 | 12/2011 |
| KR | 10-2013-0025582 A | 3/2013 |
| KR | 10-2013-0049077 A | 5/2013 |
| KR | 10-2013-0060159 A | 6/2013 |

\* cited by examiner

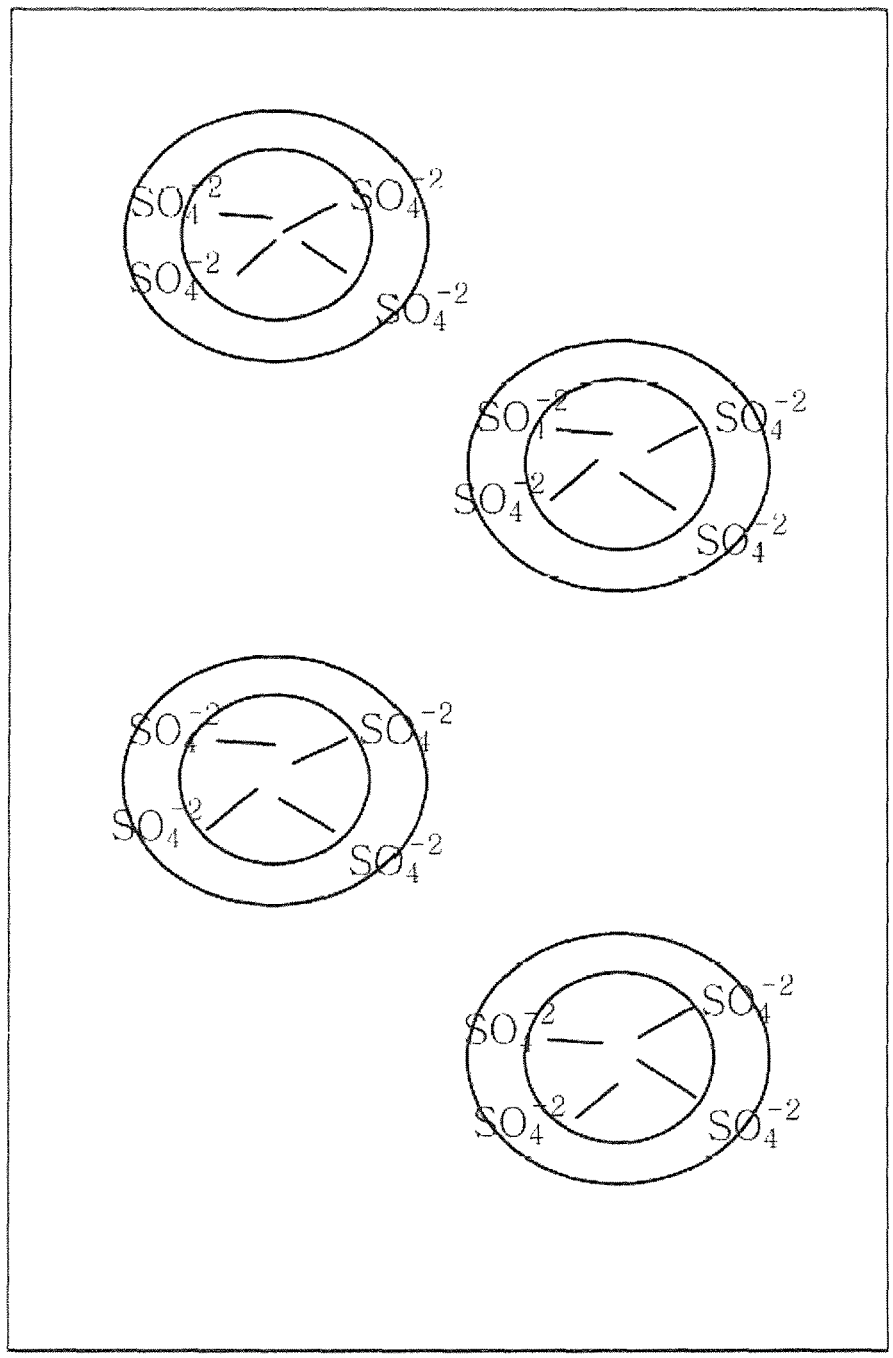

ION EXCHANGE MEMBRANE AND METHOD FOR MANUFACTURING SAME

TECHNICAL FIELD

The present invention relates to an ion exchange membrane containing a particle in which an inorganic compound is hybridized with an organic compound including a $SO_4^-$ group, use thereof and a method for manufacturing the ion exchange membrane.

BACKGROUND ART

A cation exchange membrane is one having a cation exchange group in itself to allow selective permeation of cations and is used in the field of electrodialysis, diffusion dialysis, fuel cells, or the like. Particularly, in the field of fuel cells, a cation exchange membrane is used widely for polymer electrolyte membrane fuel cells (PEMFC), direct methanol fuel cells (DMFC), redox flow batteries (RFB), or the like. An ion exchange membrane provided with lower electrical resistance, higher selective ion permeability, higher chemical stability and higher mechanical strength has higher utility.

Particular examples of the ion exchange membranes known to date include those developed by using non-fluoropolymers and polymers partially substituted with fluorine. Typical examples of such cation exchange membranes include those using polymers based on sulfonated poly(phenylene oxide), poly(phenylene sulfide), polysulfone, poly(para-phenylene), polyetherether ketone, polyimide, or the like. Most of commercially available cation exchange membranes include a fluoropolymer having a cation exchange group introduced thereto. Typical examples of such cation exchange membranes include Nafion available from DuPont, Dow membranes available from Dow Chemicals, Aciplex-S membranes available from Asahi Chemicals, and Flemion membranes available from Asahi glass. Particularly, Nafion™ includes a sulfonate group introduced to a polytetrafluoroethylene backbone, and has an ion conductivity of 0.1 S/cm under its saturated moisture content, high mechanical strength and chemical resistance. Thus, it has been used widely as an electrolyte separator in a vanadium redox flow battery.

Meanwhile, an ion exchange membrane used as a constituting element of a redox flow battery is a semi-permeable membrane which separates an electrolyte solution of a cathode from that of an anode while allowing selective permeation of cations or anions during oxidation/reduction. In addition, such an ion exchange membrane includes a main chain supporting the structure of the membrane and a function group having an ion exchange function. An ion exchange membrane is a main component that has an important effect upon the output, capacity, lifespan and cost of a redox flow battery. An ion exchange membrane including an organic material always exists in a state where it is immersed in an electrolyte solution, and thus shows higher possibility of undergoing degradation of its quality due to oxidation or the like, as compared to the other components. Therefore, the durability of such an ion exchange membrane becomes a main factor determining the lifespan of a redox flow battery. Particularly, it is problematic that the cathode and anode electrolyte solutions that are aqueous solutions damage the component, and thus causes broadening of the channel of an ion exchange membrane through which water passes, resulting in crossover of undesired ions. To prevent such a crossover phenomenon, it is known that fine inorganic particles are introduced into an organic ion exchange membrane so that the physical durability of the ion exchange membrane may be improved and the component may be prevented from being damaged. However, introduction of inorganic particles into an ion exchange membrane causes a drop in proportion of functional groups in the ion exchange membrane and a rapid decrease in ion conductivity, resulting in an increase in lifespan of a battery but degradation of quality.

Under these circumstances, the present inventors have invented an organic/inorganic hybrid ion exchange membrane by introducing inorganic particles to an ion exchange membrane, while introducing functional groups to the surface of the inorganic particles to prevent a decrease in ion conductivity and to improve physical properties.

Referring to the related art, Korean Laid-Open Patent No. 2013-0025582 discloses "Anion Exchange Membrane for Redox Flow Battery and Method for Manufacturing the Same", Korean Laid-Open Patent No. 2010-0116888 discloses "Method for Manufacturing Separator for Vanadium Redox Flow Secondary Battery and Separator Obtained Thereby", and Korean Laid-Open Patent No. 2013-0060159 discloses "Ion Exchange for Redox Flow Battery". The above-mentioned patent documents disclose ion exchange membranes containing a reaction product of an organic compound or polymer with inorganic particles and thus having improved physical properties. However, such a reaction product is different from the organic/inorganic hybrid particles disclosed herein and the method for manufacturing the same is more complex than the method disclosed herein.

DISCLOSURE

Technical Problem

A technical problem to be solved by the present invention is to provide an ion exchange membrane containing organic/inorganic hybrid particles to prevent the above-mentioned damages upon the channel of an ion exchange membrane while not causing degradation of ion conductivity, and a redox flow battery or a fuel cell including the same. Another technical problem to be solved by the present invention is to provide a method for manufacturing the ion exchange membrane.

Technical Solution

In one general aspect, there is provided an ion exchange membrane containing, in an ion channel, inorganic particles having phenyl groups substituted with $SO_4^-$ ions.

According to an embodiment, the phenyl groups are the same or different phenyl groups substituted with at least one $SO_4^-$ ion, and the phenyl groups may include a substituent other than $SO_4^-$ or not.

According to another embodiment, the inorganic particles may be silica gel.

According to still another embodiment, the silica gel may be derived from tetraethyl orthosilicate (TEOS).

In another general aspect, there is provided a redox flow battery including the ion exchange membrane. Preferably, the redox flow battery may be a vanadium redox flow battery.

In still another general aspect, there is provided a fuel cell including the ion exchange membrane.

In yet another general aspect, there is provided a method for manufacturing an ion exchange membrane, including the steps of: preparing a base membrane from a porous substrate; dipping the base membrane into a mixture containing one or more benzene compounds substituted with a hydroxy group, an inorganic particle precursor and methanol to introduce inorganic particles to the base membrane; and dipping the base membrane to which the inorganic particles are introduced into a sulfuric acid solution to introduce functional groups thereto.

According to an embodiment, the inorganic particle precursor may be tetraethyl orthosilicate (TEOS).

According to another embodiment, the benzene compounds may be the same or different benzene compounds including a substituent other than a hydroxy group or not.

According to still another embodiment, the benzene compounds may be selected from the group consisting of phenol, 3-hydroxybenzoate, salicylate, tyrosine, 3-hydroxyphenyl acetate, 4-hydroxyphenyl acetate, catechol, chlorocatechol, gentisate, homogentisate and tocatechuate.

Advantageous Effects

According to the embodiments of the present invention, the ion exchange membrane has improved physical properties and increased lifespan while minimizing degradation of ion conductivity.

DESCRIPTION OF DRAWINGS

FIG. 1 is a schematic view of the organic/inorganic hybrid ion exchange membrane obtained according to an embodiment of the present invention.

BEST MODE

Exemplary embodiments now will be described more fully hereinafter.

The present invention relates to an ion exchange membrane containing, in an ion channel, inorganic particles including phenyl groups substituted with $SO_4^-$ ions. For example, in the case of an ion exchange membrane dipped in a strong acid solution, such as an ion exchange membrane used for a redox flow battery, particularly for a vanadium redox flow battery using a vanadium ion-containing sulfuric acid solution as electrolyte, a channel performing an ion exchange function is exposed to danger of channel extension. Therefore, to prevent such channel extension, it is known that inorganic particles are introduced into an ion exchange membrane. A general method for introducing inorganic particles to an ion exchange membrane includes introducing inorganic particles, such as silica, to the polar cluster of the ion exchange membrane by using a sol-gel reaction. However, in this case, although it is possible to reduce degradation of the quality of a redox flow battery caused by a crossover phenomenon, the proportion of functional groups in the ion exchange membrane is decreased to cause the problem of degradation of output quality or the like. Accordingly, the present invention is directed to providing an organic/inorganic hybrid ion exchange membrane including silica obtained by introducing the $SO_4^-$ groups as the functional groups of the ion exchange membrane to the surface thereof so that the silica particles may function as a physical support while maintaining an ion exchange function.

In one aspect, the method for manufacturing an ion exchange membrane includes the following three steps of:
1. preparing a base membrane from a porous substrate;
2. dipping the base membrane into a mixture containing one or more benzene compounds substituted with a hydroxy group, an inorganic particle precursor and an alcohol to introduce inorganic particles to the base membrane; and
3. dipping the base membrane to which the inorganic particles are introduced into a sulfuric acid solution to introduce functional groups thereto.

Step 1 is for manufacturing a membrane structure as a framework of an ion exchange membrane. As used herein, the term 'base membrane' means a membrane structure forming a framework of an ion exchange membrane. The base membrane may be obtained by using a known method or any commercially available porous base membrane may be used as base membrane. For example, Korean Laid-Open Patent No. 2010-0116888 discloses a method for preparing a copolymerized polymer (Psf-PPSS) including a block copolymer of polysulfone with polyphenylene sulfide sulfone, the method including: dissolving commercially available polysulfone with N-methylpyrrolidone (NMP) as organic solvent, adding dichlorodipenylsulfone, sodium sulfide hydrate and lithium acetate dihydrate as catalyst to the copolymerized polymer, followed by agitation, carrying out polymerization under the flow of nitrogen gas, and gradually adding a polymerization inhibitor thereto. According to an embodiment of the present invention, the step of preparing a membrane structure may include: a) dipping a copolymer forming the framework of an ion exchange membrane in 3 wt % hydrogen peroxide ($H_2O_2$) solution at 80° C. for 60 minutes, dipping the framework in distilled water at 80° C. for 30 minutes, dipping the framework in 1M sulfuric acid solution at 80° C. for 30 minutes, and washing the framework with distilled water to provide a membrane; and b) dipping the membrane into a solution containing a mixture of methanol and distilled water at a volume ratio of 5:1.

Step 2 of introducing inorganic particles into the ion exchange membrane may be carried out by a known method including a sol-gel method. However, according to the present invention, a benzene compound substituted with a hydroxy group is used for the reaction mixture in order to substitute the inorganic particles with a hydroxy group-substituted benzene ring. The benzene compounds may include a substituent other than a hydroxy group or not, and may be the same or different benzene compounds. Particular examples of the benzene compounds may include but are not limited to: phenol, 3-hydroxybenzoate, salicylate, tyrosine, 3-hydroxyphenyl acetate, 4-hydroxyphenyl acetate, catechol, chlorocatechol, gentisate, homogentisate and tocatechuate. Hydroxy groups (—OH) facilitate not only ion exchange but also crosslinking. According to an embodiment, the step of introducing inorganic particles may be carried out by dipping an ion exchange membrane into a mixture containing inorganic particles, a hydroxy group-substituted benzene compound and methanol, followed by drying. According to another embodiment, the mixture containing inorganic particles, a hydroxy group-substituted benzene compound and methanol may have a variable mixing ratio depending on particular purpose. According to still another embodiment, the inorganic particles may be silica gel, and the inorganic particle precursor may be tetraethyl orthosilicate (TEOS).

Step 3 of introducing functional groups is directed to introducing $—SO_4^-$ to the benzene compound. The gel obtained from step 2 is positioned in the channel of an ion exchange membrane. In this case, the membrane may undergo a problem of degradation of ion exchange capability. For this, $—SO_4^-$ groups are introduced to retain the ion exchange capability of an ion exchange membrane. According to an embodiment, introduction of $—SO_4^-$ may be carried out by dipping the ion exchange membrane obtained from step 2 into 20% fuming sulfuric acid.

In another aspect, there is provided a redox flow battery including the above-described ion exchange membrane. For example, the redox flow battery may be a vanadium redox flow battery but is not limited thereto. A vanadium redox flow battery means a secondary battery storing chemical energy by using four types of vanadium ions having different oxidation states. A vanadium redox flow battery includes: a cell including an ion exchange membrane, two electrolytes separated from each other by the ion exchange membrane and electrodes; a cathode electrolyte storage tank and an anode electrolyte storage tank connected to each of the electrolytes; and a pump connected to the cell and storage tanks to carry out circulation of the electrolytes during charge and discharge. Advantageously, such a vanadium flow battery can provide nearly indefinite capacity merely by increasing the capacity of the storage tanks, can be present in a completely discharged state while not causing any harmful effect, and can allow recharge merely by exchanging electrolytes when no power is supplied. Currently, most of the electrolytes used for a vanadium flow battery are sulfuric acid electrolytes and may be obtained by a method that includes carrying out electrolysis of vanadium pentoxide in sulfuric acid solution, or the like. Such a vanadium redox flow battery using a sulfuric acid electrolyte was developed first by the University of New South Wales (Australia) (Australian Patent Publication No. 575247, 1986).

According to an embodiment, the redox flow battery may include: a cell including an ion exchange membrane, two electrolytes separated from each other by the ion exchange membrane and electrodes; a cathode electrolyte storage tank and an anode electrolyte storage tank connected to each of the electrolytes; and a pump connected to the cell and storage tanks to carry out circulation of the electrolytes during charge and discharge. According to another embodiment, the two electrolytes separated from each other by the ion exchange membrane may contain $V^{4+}/V^{5+}$ and $V^{2+}/V^{3+}$. The redox flow battery according to the present invention may be obtained by any known method, as long as it uses the ion exchange membrane according to the present invention. For example, Korean Laid-Open Patent No. 2013-0049077 discloses a method for manufacturing a redox flow battery including the following steps. Particularly, an insulator (Teflon film), collector (gold plate) and a bipolar plate (graphite) are stacked on a nut-assembled end plate. Next, one of the two electrodes obtained by heat treating carbon felt sheets (Nippon Graphite, GF20-3) at 500° C. for 5 hours is inserted into the concave surface of the bipolar plate to provide a cathode cell. An anode cell is also provided in the same manner. Then, a cathode electrolyte (0.2M Fe(2,2'-bipyridine)$_3$(BF$_4$)$_2$ and 0.5M SBPBF4 salt dissolved in polycarbonate (PC) solvent) is injected to the cathode cell to finish the cathode cell. In addition, an anode electrolyte (0.1M Ni(2,2'-bipyridine)$_3$(BF$_4$)$_2$ and 0.5M SBPBF4 salt dissolved in PC solvent) is injected to the anode cell to finish the anode cell. After that, the two cells are disposed in such a manner that they face each other, and four bolts having a Belleville spring are inserted so that they pass through the two cells. Then, the bolts are tightened by using a torque wrench to 1.5 Nm in the order of a diagonal line to assemble the cells. Each of the remaining electrolytes is injected through the injection port of each electrode, and then the injection ports are sealed by using Teflon bolts. In this manner, it is possible to finish a redox flow battery.

In still another aspect, there is provided a fuel cell including the ion exchange membrane according to the present invention. A fuel cell is a device by which chemical energy generated by oxidation is converted into electric energy. A hydrogen fuel cell uses hydrogen as fuel and oxygen as oxidant. In a variant, a hydrogen fuel cell may use hydrocarbon or alcohol as fuel and air, chlorine or chlorine dioxide as oxidant. Fuel cells may be classified into molten carbonate fuel cells, polymer electrolyte fuel cells, solid oxide fuel cells, direct methanol fuel cells, direct ethanol fuel cells, phosphoric acid fuel cells, or the like, depending on the type of electrolyte used therein. For example, Korean Patent Publication No. 0331079 discloses a molten carbonate fuel cell. Particularly, such a fuel cell includes: an anode in which hydrogen of fuel gas reacts with carbonate ions to produce water and carbon dioxide while generating electrons; a cathode in which carbon dioxide of oxidant gas reacts with two electrons to produce carbonate ions; an upper separator and a lower separator for separating fuel gas from oxidant gas while supporting the main body of a fuel cell to form flow paths for gas supplied to each of the anode and cathode; an anode collector supporting the anode and collecting the charges generated from the anode; a cathode collector supporting the cathode and collecting the charges generated from the cathode; a first electrolyte plate stacked in such a manner that it touches the top of the anode to transfer only ions between the anode and the cathode; a second electrolyte plate carrying out the same function as the first electrolyte plate; and a first matrix and a second matrix that allow the electrolyte plates to retain their shape, have a porous structure including pores to be impregnated with the electrolytes so as to absorb and receive molten carbonate, and are stacked alternately on the top of the first electrolyte plate together with the second electrolyte plate. For example, a polymer electrolyte fuel cell includes: a membrane-electrode-gas diffusion layer assembly formed by a polymer electrolyte membrane, an anode and a cathode having a platinum catalyst layer and disposed at both ends of the electrolyte plate, and a gas diffusion layer including porous carbon and disposed at the exterior of the anode and the cathode; and a separator supporting the assembly at both sides thereof while forming a gas flow path. Korean Patent Publication No. 0405671 discloses a method for manufacturing a polymer electrolyte fuel cell, including the steps of: a) irradiating at least one polymer electrolyte membrane selected from the group consisting of polyperfluorosulfonates with ion beams having an energy of 0.1-2.0 keV at a dose of $1\times10^{13}$-$1\times10^{19}$ ions/cm$^2$ to form surface irregularities on the surface of the membrane; b) forming a catalyst slurry by mixing a solvent, a thickener, and a catalyst obtained by supporting, on carbon black, 5-40 wt % of platinum or platinum-ruthenium alloy based on the total weight of the catalyst; c) coating both surfaces of the polymer electrolyte membrane with the catalyst slurry to form an anode and a cathode; and d) disposing a gas diffusion layer made of carbon fibers on the exterior of each electrode. In addition, Korean Patent Publication No. 1100897 discloses a method for manufacturing an electrolyte membrane for a direct methanol fuel cell, including the steps of: preparing sol-like sulfonated titanium dioxide; impregnating the sol-like sulfonated titanium dioxide with an ion conductive polymer; and gelling the sulfonated titanium dioxide sol impregnated with the ion conductive polymer. Further, many documents disclose methods for manufacturing fuel cells. The fuel cell according to the present invention may be obtained by using any method, as long as the method is suitable.

MODES FOR INVENTION

The present invention will be explained in more detail with reference to examples and experiments. However, it is apparent to those skilled in the art that the following examples and experiments are for illustrative purposes only and not intended to limit the scope of this disclosure

Example 1

Preparation of Ion Exchange Membrane 1

Nafion 117 is dipped in hydrogen peroxide at 80° C. for 2 hours and further dipped in distilled water at 80° C. for 3 hours. Then, the membrane is dipped in 1M sulfuric acid at 80° C. for 2 hours to perform pretreatment thereof, followed by washing with distilled water. After that, the ion exchange membrane is dipped in a solution containing methanol and distilled water at a volume ratio of 5:1 for 1 day or more to obtain a base membrane.

Then, tetraethyl orthosilicate (TEOS) and phenol are dissolved into methanol at a molecular weight ratio of 1:1 to provide a mixed solution. The ion exchange membrane is dipped in the resultant mixed solution for 2 minutes, followed by washing with distilled water. The washed ion exchange membrane is further dipped in 20% fuming sulfuric acid for 4 hours to obtain an ion exchange membrane to which $SO_4^-$ is introduced.

Example 2

Preparation of Ion Exchange Membrane 2

A hydrogen fluoride membrane is dipped in hydrogen peroxide at 80° C. for 4 hours and in distilled water at 80° C. for 5 hours to carry out pretreatment, followed by washing with distilled water. Then, the ion exchange membrane is dipped in a solution containing methanol and distilled water at 40° C. at a mixing ratio of 5:1 for 1 day or more to obtain a base membrane.

Then, tetraethyl orthosilicate (TEOS) and phenol are dissolved into methanol at a molecular weight ratio of 1:1 to provide a mixed solution. The ion exchange membrane is dipped in the resultant mixed solution for 2 minutes, followed by washing with distilled water. The washed ion exchange membrane is further dipped in 20% fuming sulfuric acid for 6 hours to obtain an ion exchange membrane to which $SO_4^-$ is introduced.

Comparative Example

A commercially available membrane, Nafion 117 is used as Comparative Example, in addition to the ion exchange membranes according to Example 1 and Example 2.

Example 3

Evaluation for Quality of Ion Exchange Membrane

Each of the ion exchange membranes according to Examples 1 and 2 is evaluated by determining the membrane resistance, ion permeability and battery test energy efficiency.

1) Determination of Membrane Resistance

Each of the ion exchange membranes according to Examples 1 and 2 and Comparative Example is cut into a size of 8 cm×15 cm, washed with distilled water twice or three times, and dipped in distilled water for 3 hours or more. Then, each ion exchange membrane is mounted to and assembled with a standard cell. In the assembled standard cell, the cathode is filled with 2M $V^{4+}$, 2.5M $H_2SO_4$ and the anode is filled with 2M $V^{3+}$, 2.5M $H_2SO_4$. After that, impedance is measured at a frequency of 1 MHz-1000 kHz. Impedance measurement is repeated five times continuously and the average value is calculated when the resistance values shows a rate of change within 5%. The results are shown in the following Table 1.

2) Determination of Ion Permeability

Each of the ion exchange membranes is cut into a size of 2 cm×2 cm, and dipped in distilled water for at least 3 hours. The dipped ion exchange membrane is assembled with a diffusion cell and both containers of the cell are filled with water to determine whether leakage occurs or not. The left-side container is filled with 50 mL of 2M $VOSO_4$, 2.5M $H_2SO_4$ solution and the right-side container is filled with 50 mL of 2M $MgSO_4$, 2.5M $H_2SO_4$ solution, followed by agitation. After 1, 3, 5, 7, 10 and 23 hours, the solution of the right-side container is taken in an amount of 40 μL and the container is filled with 40 μL of 2M $MgSO_4$, 2.5M $H_2SO_4$ solution. The sample is determined for its vanadium concentration by using a spectrophotometer or ICP-AES (Inductively Coupled Plasma-Atomic Emission Spectrometer). When a spectrophotometer is used, absorbance is used and compared with a standard curve to determine concentration. The results are shown in the following Table 1.

3) Determination of Battery Test Energy Efficiency

A vanadium redox flow battery (VRFP) having an electrode area of 40 $cm^2$ is subjected to a charge/discharge test to determine energy efficiency. The results are shown in the following Table 1.

TABLE 1

| | Membrane Resistance ($\Omega cm^2$) | Ion Permeability (mmol/min) | Battery test energy efficiency (%) |
|---|---|---|---|
| Example 1 | 1.49 | $1.89 \times 10^{-4}$ | 71 |
| Example 2 | 1.35 | $2.78 \times 10^{-4}$ | 79 |
| Comparative Example (Nafion 117) | 1.28 | $8.677 \times 10^{-4}$ | 79 |

As can be seen from Table 1, the ion exchange membranes according to the inventive Examples have an average membrane resistance of 1.49 $\Omega cm^2$ and 1.35 $\Omega cm^2$, which are similar to the membrane resistance of Comparative Example (Nafion 117), 1.28 $\Omega cm^2$. In addition, the ion exchange membranes according to the inventive Examples have an ion permeability of $1.89 \times 10^{-4}$ mmol/min and $2.78 \times 10^{-4}$ mmol/min. Thus, it can be seen that the ion permeability of each of the exchange membranes according to the present invention is not significantly lower as compared to the ion permeability of Nafion, $8.677 \times 10^{-4}$ mmol/min. Referring to energy efficiency determined through a charge/discharge test, the ion exchange membrane according to Example 2 shows an energy efficiency of 79%, which is the same as the energy efficiency of Nafion. In addition, the ion exchange membrane according to Example 1 shows an energy efficiency of 71%, which is similar to the energy efficiency of Nafion.

In brief, the ion exchange membranes according to the inventive Examples show a membrane resistance, ion permeability and energy efficiency similar to the membrane resistance, ion permeability and energy efficiency of the commercially available ion exchange membrane, and also provide improved physical properties by introducing inorganic particles while maintaining a ratio of functional groups ($SO_4^-$).

While the exemplary embodiments have been shown and described, it will be understood by those skilled in the art that various changes in form and details may be made thereto without departing from the scope of this disclosure as defined by the appended claims. Therefore, it is intended that the scope of the present invention includes all embodiments falling within the spirit and scope of the appended claims.

The invention claimed is:

1. A fuel cell comprising an ion exchange membrane containing, in an ion channel, inorganic particles functionalized with phenyl groups substituted with $SO_4^-$ ions,
  wherein the phenyl groups further include a substituent other than $SO_4^-$ ions.

2. The ion exchange membrane according to claim 1, wherein the inorganic particle is silica gel.

3. The ion exchange membrane according to claim 2, wherein the silica gel is derived from tetraethyl orthosilicate (TEOS).

4. A redox flow battery comprising the ion exchange containing, in an ion channel, inorganic particles functionalized with phenyl groups substituted with $SO_4^-$ ions, wherein the phenyl groups further include a substituent other than $SO_4^-$ ions.

5. A method for manufacturing an ion exchange membrane, comprising the steps of:
  preparing a base membrane from a porous substrate;
  dipping the base membrane into a mixture containing one or more benzene compounds substituted with a hydroxy group, an inorganic particle precursor and methanol to introduce inorganic particles to the base membrane; and
  dipping the base membrane to which the inorganic particles are introduced into a sulfuric acid solution to introduce functional groups thereto.

6. The method for manufacturing an ion exchange membrane according to claim 5, wherein the inorganic particle precursor is tetraethyl orthosilicate (TEOS).

7. The method for manufacturing an ion exchange membrane according to claim 5, wherein the benzene compounds further comprises benzene compounds including a substituent other than a hydroxy group.

8. The method for manufacturing an ion exchange membrane according to claim 7, wherein the benzene compound is selected from the group consisting of phenol, 3-hydroxybenzoate, salicylate, tyrosine, 3- hydroxyphenyl acetate, 4-hydroxyphenyl acetate, catechol, chlorocatechol, gentisate, homogentisate and tocatechuate.

* * * * *